Sept. 30, 1958     S. PALMER     2,854,059
APPARATUS FOR PRODUCING BONDED STAPLE
LENGTHS OF GROUPED FILAMENTS
Filed Oct. 7, 1955
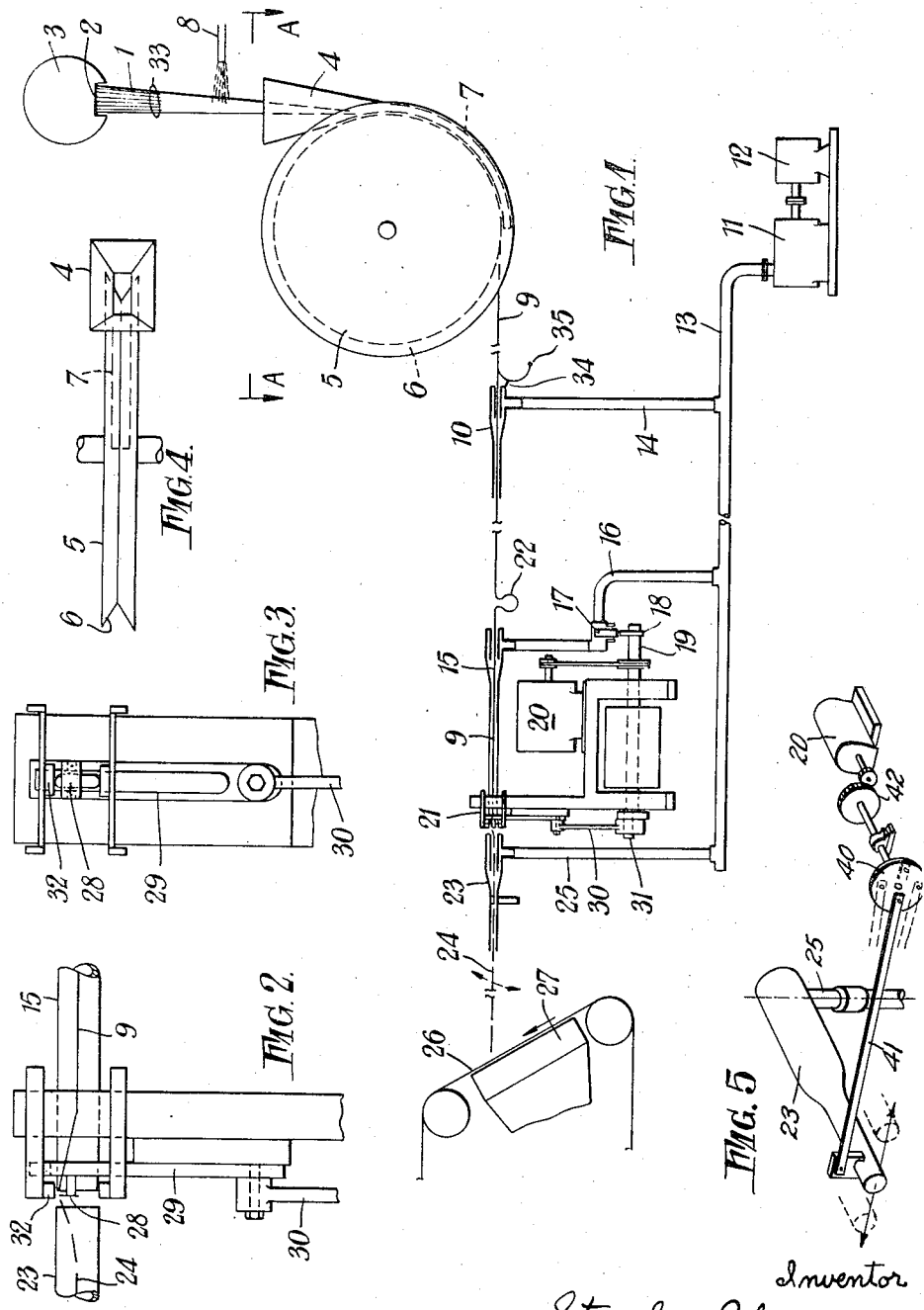
Inventor
Stanley Palmer
by Pierce, Scheffler & Parker
atty's

United States Patent Office 2,854,059
Patented Sept. 30, 1958

2,854,059

APPARATUS FOR PRODUCING BONDED STAPLE LENGTHS OF GROUPED FILAMENTS

Stanley Palmer, Liversedge, England, assignor to Versil Limited, Liversedge, England, a British company Application October 7, 1955, Serial No. 539,255

Claims priority, application Great Britain October 7, 1954

4 Claims. (Cl. 154—1.7)

This invention relates to an improved method and apparatus for the production of staple lengths of grouped and bonded filaments, such as filaments of glass, plastic or other material capable of being produced continuously as by extrusion, for use in forming webs or mats of bonded staple lengths.

Such webs or mats are particularly suitable for use in resin laminates intended for the manufacture of moulded shaped bodies for coachwork or parts thereof, boat hulls or the like.

The invention has for its object to provide an improved method and apparatus whereby the production of such staple lengths and of webs or mats consisting of bonded staple lengths of grouped filaments may be facilitated.

According to the present invention, a method for the production of staple lengths of grouped and bonded filaments comprises forming continuous filaments, grouping and bonding together a number of the continuous filaments, and cutting the grouped filaments into staple lengths while said filaments are being continuously formed.

The invention includes a method of producing a web or mat of staple lengths of grouped filaments which comprises forming continuous filaments, grouping and binding together a number of continuous filaments, cutting the grouped and bonded filaments into staple lengths while said filaments are being continuously formed, distributing the staple lengths on to a carrier surface and bonding the staple lengths together to form a web or mat. The staple lengths, as they are cut off from the continuous grouped and bonded filaments, may be distributed on to a continuously moving conveyor surface in such manner as to build up a web or mat. Feeding of the grouped and bonded filaments to cutting means and discharge of the staple lengths from said cutting means may be effected by the use of ejector air traction devices. Distribution of the staple lengths on to the carrier or conveyor surface may be effected by lateral oscillation of an ejector air traction device receiving the staple lengths from the cutting means.

The invention also includes apparatus for carrying out the method above defined, comprising a rotatable element, such as a drum, receiving a plurality of filaments from an extrusion die plate or nozzles and having a V groove for grouping the filaments, a first ejector air traction device arranged to withdraw the grouped filaments from the drum whereby traction is exerted on the drum for attenuating the filaments, a second ejector air traction device operating intermittently to feed the grouped filaments to oscillating cutter device, and a third ejector air traction device operating continuously to tension the grouped filaments during cutting and to discharge the staple lengths from the cutter device. A continuously moving conveyor surface may be arranged to receive the staple lengths discharged from said third ejector air traction device which may be oscillated laterally to distribute the staple lengths over the width of said conveyor surface. The part of the conveyor surface receiving the staple lengths may be arranged to travel upwardly on an inclined path over a suction box serving to retain the staple lengths on the conveyor surface.

Means may be provided for treating the filaments with a suitable adhesive, such as a monomer of a low pressure resin, at any point prior to or during their contact with the rotatable element.

The first ejector air traction device may have a suitably disposed blade at the inlet end for removing any bead that may be formed in the event of breakage of a filament between the rotatable element and the point of extrusion or formation.

The apparatus may comprise two or more units arranged in parallel and distributing staple lengths on to a common carrier or conveyor surface either in parallel or overlapping bands, or in successively applied layers.

The conveyor surface may be a paper or other base which, when the distributed staple lengths are bonded together by application of a suitable bonding medium, forms part of the web or mat.

The invention includes webs or mats of bonded staple lengths of grouped filaments produced by the method and/or apparatus above defined.

The invention is hereinafter described, by way of example, with reference to the accompanying diagrammatic drawings, in which:

Fig. 1 is a diagrammatic side elevation illustrating one embodiment of apparatus according to the invention;

Fig. 2 is detail side elevation of the cutter device shown in Fig. 1;

Fig. 3 is an end elevation corresponding to Fig. 2;

Fig. 4 is a plan view of the hopper and drum shown in Fig. 1; and

Fig. 5 is a perspective view of the means for oscillating the ejector air traction device about a vertical axis.

In carrying the invention into effect according to one embodiment, and in particular application of the invention to the production of a web or mat of bonded staple lengths of grouped and bonded glass filaments, filaments 1 extruded downwardly from a die plate 2 of a furnace 3 are guided by means of a hopper 4 on to the periphery of a rotatable element 5, such as a drum or disc, having a V groove 6 whereby the filaments 1 are grouped together. The hopper 4 may have an arcuate extension 7 extending round part of the periphery of the rotatable element 5 within the V groove 6. A suitable adhesive, such as a monomer of a low pressure resin, may be sprayed on to the filaments 1 from a nozzle 8, or may be otherwise applied to the filaments at any point before or during their contact with the rotatable element 5, so that the filaments forming the group are caused to adhere together.

The grouped filaments 9 are led off from the drum horizontally and pass through a first ejector air traction device 10 of conventional form which, in withdrawing the grouped filaments 9 from the rotatable element 5, exerts traction thereon and thereby attenuates the filaments 1. The air traction device 10 is continuously operated by a blast of air supplied by a blower 11 driven by a motor 12 and conducted through a pipe 13 and a branch pipe 14.

A second ejector air traction device 15 receives air from the pipe 13 through a branch pipe 16 under the control of a valve 17 operated by means such as an eccentric 18 on a shaft 19 driven from a motor 20 so that the feed action of the device 15 is intermittently interrupted. A cutter device 21 is driven from the shaft 19 so as to operate to cut the grouped filaments 9 when the feed action of the ejector air traction device 15 is interrupted. During non-feeding periods of the device 15 the grouped filaments 9 fed continuously forward by the device 10 may form a loop at an intermediate position, as indicated at 22.

A third ejector air traction device 23 is arranged at the outlet side of the cutter device 21 to receive the staple lengths 24 as they are cut off from the grouped filaments 9, the device 23 being continuously operated by a blast of air from the pipe 13 through the branch pipe 25 so as to tension the grouped filaments during the cutting operation and to discharge the staple lengths 24 on to a carrier or conveyor surface 26 travelling upwardly on an inclined path and at a relatively slow speed over a suction box 27 which serves to retain the staple lengths 24 on the surface 26 while they are treated with a suitable bonding medium to form a web or mat on the surface 26.

In order to distribute the staple lengths over the width of the conveyor surface 26, and in random overlapping arrangement so as to build up a suitable thickness of web or mat, the ejector air traction device 23 may be mounted to pivot about a vertical axis adjacent its inlet end and oscillated laterally by any suitable means, e. g. a crank and connecting rod arrangement 40, 41 driven through suitable reduction gearing 42 from the motor 20.

The cutter device 21 may comprise a blade 28 carried by a slide 29 operated through a connecting rod 30 from a crank 31 or eccentric on the shaft 19, the blade 28 acting upwardly against a block 32 to sever the grouped filaments 9 to form the staple lengths 24.

In the event of breakage of a filament 1 between the rotatable element 5 and the furnace 3, the temperature at a point 33 below the die plate 2 is sufficient to melt off the issuing portion of the broken filament to form a bead of glass which eventually gravitates drawing a filament behind it and passes into the guide hopper 4 whereby it is grouped and bonded to the unbroken filaments and drawn forward by the first ejector air traction device 10. A serrated blade 34 is arranged at the inlet end of the traction device 10 so as to remove, by impact, the bead 35 of glass and a portion of the filament behind it and thus avoid interference with continuity of operation of the apparatus.

In order to facilitate building up a web or mat of the desired thickness, two or more units such as described may be arranged in parallel in conjunction with a single conveyor for depositing staple lengths in parallel bands which may overlap, or in successive layers. Alternatively, several units may be arranged one above the other, or in series, to deposit staple lengths on to the carrier or conveyor surface at spaced positions along its length.

It will be understood that the invention is not limited to the particular embodiment hereinbefore described. For example, the invention is applicable for the production of staple lengths of grouped filaments of any other extrudable material, such as plastic, the cutter device may be of any suitable construction, and the drum may comprise several grooves for receiving separate groups of filaments passing to parallel ejector air traction devices.

If desired, the first ejector air traction device 10 may be arranged to withdraw the grouped filaments 9 in an upward direction so that the grouped filaments are maintained in contact with the rotatable element 5 for a longer period. The staple lengths 24 delivered from the ejector air traction device 23 may be directed on to a substantially horizontal carrier or conveyor surface from above. Furthermore, it is within the scope of the invention to collect the staple lengths produced in the manner described and subsequently to distribute them in any suitable manner on to a stationary or moving surface to form a web or mat in which the staple lengths are bonded together by the application of a suitable bonding medium.

I claim:

1. Apparatus for producing a mat article comprising means for continuously forming extruded filaments, means including a rotatable drum element having a V-shaped groove in the periphery thereof for grouping and bonding together the filaments, first air traction ejector means for withdrawing the grouped filaments from said drum element under tension to exert traction on the drum and to attenuate the filaments, means for cutting the grouped and bonded filaments into short lengths, second air traction ejector means operating intermittently to feed the grouped filaments from said first air traction ejector means to said cutting means, a movable carrier surface upon which the mat article is to be built up, third air traction ejector means operating continuously to tension the grouped filaments during cutting and to feed the cut lengths from the cutter device to said carrier surface, and means for oscillating said third air traction ejector means to distribute the cut lengths across the width of the carrier surface in random superposed arrangement.

2. Apparatus for producing a web or mat article as defined in claim 1 including suction means associated with said movable carrier surface to cause said cut lengths to be retained upon said carrier surface.

3. Apparatus for producing a web or mat article as defined in claim 1 including blade means associated with the inlet side of the first air traction ejector device for removing beaded flaw projections from the filaments.

4. Apparatus for producing a web or mat article as defined in claim 1 including means for applying a suitable adhesive to the filaments at a point prior to the point of contact of the filaments with the rotatable drum element.

References Cited in the file of this patent

UNITED STATES PATENTS

| | | |
|---|---|---|
| 2,357,392 | Francis | Sept. 5, 1944 |
| 2,411,660 | Manning | Nov. 26, 1946 |
| 2,476,582 | Browne et al. | July 19, 1949 |
| 2,518,744 | Barnard | Aug. 15, 1950 |
| 2,522,722 | Mitchell | Sept. 19, 1950 |
| 2,693,844 | Bay | Nov. 9, 1954 |
| 2,719,336 | Stotler | Oct. 4, 1955 |
| 2,723,215 | Biefeld et al. | Nov. 8, 1955 |
| 2,732,885 | Van Der Hoven | Jan. 31, 1956 |
| 2,758,952 | Toulmin | Aug. 14, 1956 |
| 2,787,314 | Anderson | Apr. 2, 1957 |